United States Patent
Vescovini (10) Patent No.: US 10,035,394 B2
(45) Date of Patent: Jul. 31, 2018

(54) ROLL ANGLE STOP ARRANGEMENT FOR A SUSPENSION SYSTEM IN AN OFF-ROAD VEHICLE

(71) Applicant: CNH Industrial America LLC, New Holland, PA (US)

(72) Inventor: Maurizio Vescovini, Vescovini (IT)

(73) Assignee: CNH Industrial America LLC, New Holland, PA (US)

( * ) Notice: Subject to any disclaimer, the term of this patent is extended or adjusted under 35 U.S.C. 154(b) by 113 days.

(21) Appl. No.: 15/301,909

(22) PCT Filed: Apr. 8, 2015

(86) PCT No.: PCT/EP2015/057636
§ 371 (c)(1),
(2) Date: Oct. 4, 2016

(87) PCT Pub. No.: WO2015/155251
PCT Pub. Date: Oct. 15, 2015

(65) Prior Publication Data
US 2017/0120706 A1    May 4, 2017

(30) Foreign Application Priority Data

Apr. 9, 2014  (IT) .............................. MO2014A0098

(51) Int. Cl.
*B60G 9/02*     (2006.01)
*B60G 21/05*    (2006.01)
*B60G 13/06*    (2006.01)

(52) U.S. Cl.
CPC ............. *B60G 9/027* (2013.01); *B60G 13/06* (2013.01); *B60G 21/05* (2013.01);
(Continued)

(58) Field of Classification Search
CPC ........ B60G 9/027; B60G 13/06; B60G 21/05; B60G 2300/082; B60G 2300/07; B60G 2204/45; B60G 2200/326
See application file for complete search history.

(56) References Cited

U.S. PATENT DOCUMENTS 5,322,310 A * 6/1994 Hurlburt ................... B60G 9/02
                                                180/266
5,447,321 A * 9/1995 Hurlburt ................... B60G 9/02
                                                180/266
(Continued)

OTHER PUBLICATIONS

Search Report and Opinion for related Italian Application No. MO20140098 dated Oct. 10, 2014.

*Primary Examiner* — Darlene P Condra
(74) *Attorney, Agent, or Firm* — Rickard K. DeMille; Rebecca L. Henkel (57) ABSTRACT

An off-road vehicle includes a chassis, an axle carriage, a rigid axle and a pair of suspension cylinders. The axle carriage is attached to or forms a part of the chassis, and includes a generally vertically arranged slot. The rigid axle is mounted to the axle carriage with a wheel hub at each end thereof, and is vertically movable relative to the axle carriage. The suspension cylinders are connected between the axle carriage and axle, and are operable to move the axle in vertical directions relative to the axle carriage. The off-road vehicle is characterized in that the axle includes a first pair of roll angle stops which engage the axle carriage when the axle is at or near a fully lowered position relative to the axle carriage, and a second pair of roll angle stops which engage the axle carriage when the axle is at or near a fully raised position relative to the axle carriage.

20 Claims, 12 Drawing Sheets

(52) U.S. Cl.
CPC .... *B60G 2200/326* (2013.01); *B60G 2204/45* (2013.01); *B60G 2300/07* (2013.01); *B60G 2300/082* (2013.01)

(56) References Cited

U.S. PATENT DOCUMENTS

| | | | |
|---|---|---|---|
| 5,879,016 | A | 3/1999 | Altherr et al. |
| 5,931,486 | A | 8/1999 | Andreis |
| 6,056,304 | A | 5/2000 | Brambilla |
| 6,502,840 | B1 | 1/2003 | Leyonhjelm et al. |
| 8,172,014 | B2 * | 5/2012 | Brown ............... B62K 5/08 180/209 |
| 8,280,590 | B2 * | 10/2012 | Mackin ............... A01D 41/12 701/41 |
| 2003/0129046 | A1 * | 7/2003 | Simpson ............. B60P 1/6454 414/343 |
| 2004/0104553 | A1 | 6/2004 | Richardson |
| 2005/0082780 | A1 | 4/2005 | Seeds et al. |
| 2005/0275181 | A1 * | 12/2005 | MacIsaac ............. B60G 3/01 280/124.103 |
| 2007/0235972 | A1 | 10/2007 | Schmitz |
| 2009/0033068 | A1 | 2/2009 | Fischer |
| 2015/0197130 | A1 * | 7/2015 | Smith ............... B60G 11/46 280/124.175 |

* cited by examiner

ROLL ANGLE STOP ARRANGEMENT FOR A SUSPENSION SYSTEM IN AN OFF-ROAD VEHICLE

CROSS REFERENCE TO RELATED APPLICATIONS

This application is a US National Stage filing of International Application Serial No. PCT/EP2015/057636, entitled "ROLL ANGLE STOP ARRANGEMENT FOR A SUSPENSION SYSTEM IN AN OFF-ROAD VEHICLE," filed Apr. 8, 2015, which claims priority to Italian Application Serial No. MO2014A000098, filed Apr. 9, 2014, each of which is incorporated by reference herein in its entirety for all purposes.

BACKGROUND OF THE INVENTION

1. Field of the Invention

The present invention relates to suspension systems for vehicles, and, more particularly, to suspension systems for off-road vehicles.

2. Description of the Related Art

Vehicles in the form of off-road machines can take many forms, such as agricultural tractors, harvesters and sprayers, construction backhoes, and forestry feller/bunchers. In the case of an agricultural tractor, a chassis typically supports front and rear laterally extending axles having wheels rotatably affixed at the ends of the axles. Rear axles are commonly rigidly connected to the chassis, and there is no suspension between the rear axle and the chassis. Tire deflection alone provides a cushioning between a rough surface and the chassis. In many tractors, the front wheels are driven in addition to the rear driven wheels, typically known as mechanical front wheel drive (MFD or MFWD). Economics and simplicity typically dictate that rigid front axle assemblies are used in lieu of an independently articulated front suspension. Front axles are typically pivotally attached to the front of the chassis to rotate, transversely with respect to the longitudinal axis of the chassis, around a pivot axis located proximate to the longitudinal middle of the axle. With this axle structure, when one front wheel is raised to overcome an obstacle the other front wheel goes down the same distance.

The productivity of an agricultural tractor can be increased by enabling faster travel speeds in the field and on the road. Limiting factors to the travel speed of an agricultural tractor when traveling over rough surfaces are operator comfort and wheel traction. Faster travel speeds highlight shortcomings in the conventional pivotally attached rigid front axle, especially when both wheels simultaneously encounter a similar obstacle, such as a ditch. When both wheels must move in the same direction to traverse an obstacle, the entire front end of the vehicle is forced to move in the same vertical direction.

Tractor front axle suspensions can solve these problems by enabling the entire axle to move in relation to the chassis. By damping such motion traction and operator comfort may be increased both of which may contribute to increased productivity. Additionally, front suspension systems for tractors provide better high-speed handling characteristics during high-speed operation on roads. The addition of more sophisticated actuators and control systems to these suspension systems further extend the capabilities of the tractor and provide additional improvements in vehicle ride and handling.

As a suspension system moves up and down, the degree to which the axle can roll about the pivot axis varies so that the wheels at the end of the axle do not hit the chassis, sheet metal or other parts of the vehicle. When the axle is further from the chassis the maximum roll angle can be greater, and when the axle is closer to the chassis the maximum roll angle must be less.

A front suspension system as describe above typically includes an axle carriage which is mounted to or part of the chassis, and the rigid front axle is mounted to the axle carriage. A suspension arm is pivotally mounted to the chassis at the rear of the arm, and pivotally coupled with the axle at the point of connection of the MFD drive shaft with the axle. As the axle moves up and down, the suspension arm pivots about the rear pivot attachment. It is known to provide two pairs of roll angle stops for limiting the roll angle of the axle when the axle is at a raised or lowered position relative to the axle carriage. When the axle is at a fully raised position (closest to the axle carriage), one pair of roll angle stops is between the axle and axle carriage to limit the roll angle of the axle. On the other hand, when the axle is at a predefined position in the suspension stroke such as the fully lowered position (furthest from the axle carriage), the other pair of roll angle stops is between the axle and suspension arm to limit the roll angle of the axle. High loads can be placed on the suspension arm when the roll angle stop of the axle hits the suspension arm, and thus the suspension arm is typically built very robust to withstand the loads. A heavily built suspension arm results in more weight and expense.

What is needed in the art is a front suspension system for an off-road vehicle which effectively limits the roll angle of the axle, depending on the height of the axle relative to the axle carriage.

SUMMARY OF THE INVENTION

The present invention provides a suspension system for an off-road vehicle which includes a first pair of roll angle stops when the axle is within a first predetermined range of movement, and a second pair of roll angle stops when the axle is within a second predetermined range of movement.

The invention in one form is directed to an off-road vehicle including a chassis, an axle carriage, a rigid axle and a pair of suspension cylinders. The axle carriage is attached to or forms a part of the chassis, and includes a generally vertically arranged slot. The rigid axle is mounted to the axle carriage with a wheel hub at each end thereof, and is vertically movable relative to the axle carriage. The suspension cylinders are connected between the axle carriage and axle, and are operable to move the axle in vertical directions relative to the axle carriage. The off-road vehicle is characterized in that the axle includes a first pair of roll angle stops which engage the axle carriage when the axle is at or near a fully lowered position relative to the axle carriage, and a second pair of roll angle stops which engage the axle carriage when the axle is at or near a fully raised position relative to the axle carriage.

An advantage of the present invention is that the size and weight of the suspension arm can be reduced, thereby reducing the overall cost.

Another advantage is that high loads are no longer placed on the suspension arm by a roll angle stop of the axle.

Yet another advantage is that both pairs of roll angle stops are between the axle and axle carriage, regardless whether the axle is at a fully lowered position, fully raised position, or another position therebetween.

A further advantage is that the axle moves only along the predefined movement path between the axle and axle carriage, thereby limiting side movement and slippage of the axle and wheels.

A still further advantage is that a variable roll angle oscillation is provided, depending on the position of the axle relative to the axle carriage.

Yet another advantage is that the suspension system of the present invention provides a compact system which can be installed in low and short length vehicles for improved visibility and maneuverability.

A further advantage is that the reduced mass of the suspension arm reduces the unsprung masses of the system so that the suspension controls work better and the suspension dynamics are improved with better adherence between the tires and the road surface.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
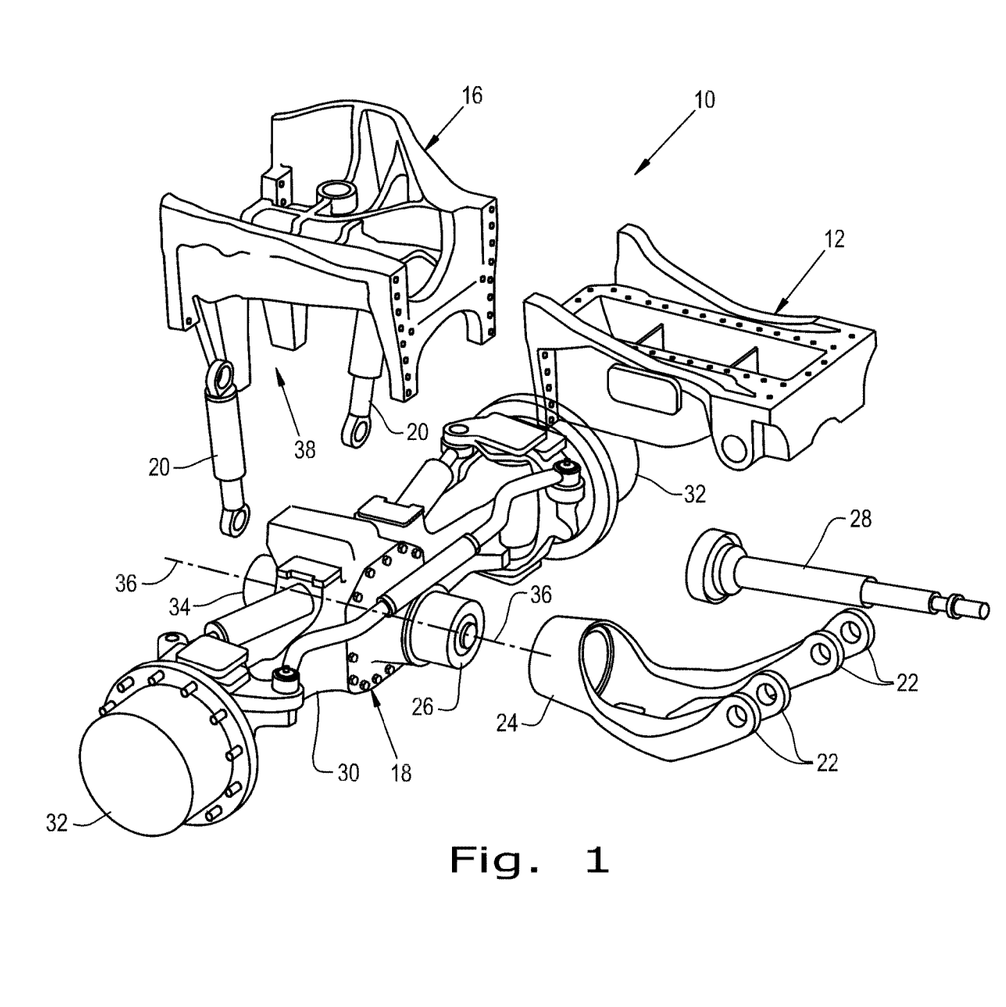
FIG. 1 is an exploded perspective view of an embodiment of a suspension system of the present invention.
Figure 2:
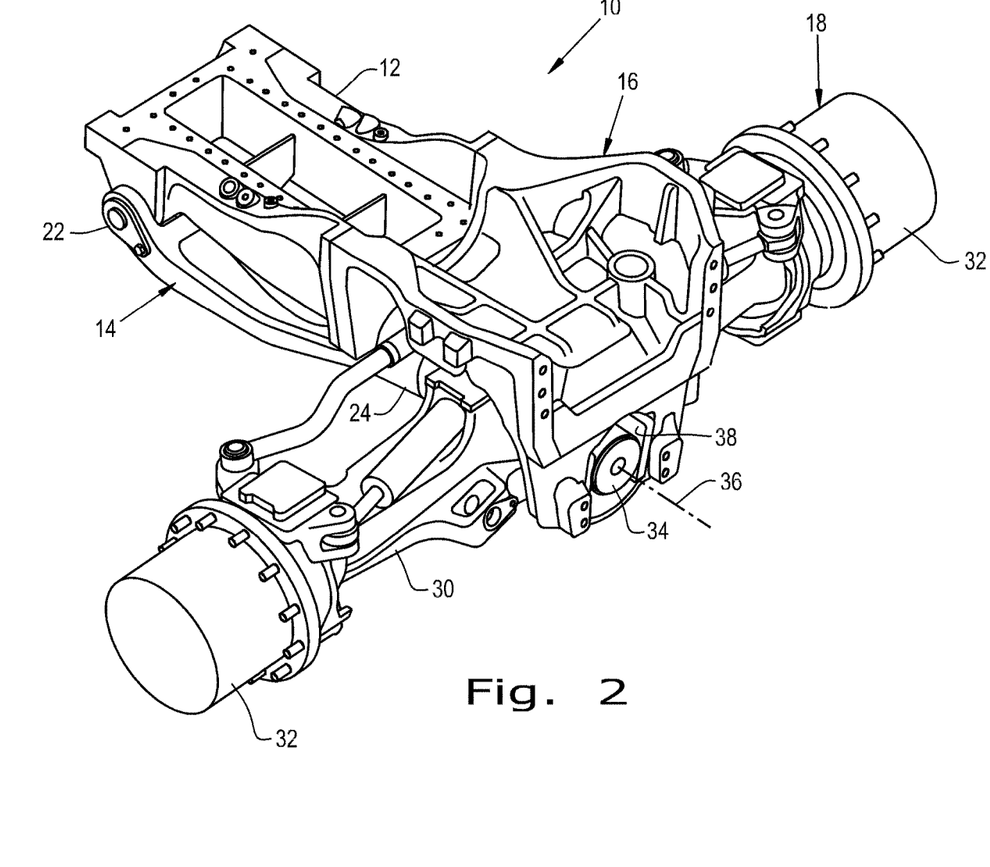
FIG. 2 is an assembled perspective view of the suspension system shown in FIG. 1.

Referring now to the drawings, and more particularly to FIGS. 1 and 2, there is shown a portion of an embodiment of an off-road vehicle 10. In the embodiment shown, the off-road vehicle 10 is configured as an agricultural tractor, but can be differently configured depending on the application. Tractor 10 generally includes an oil sump 12, a suspension arm 14, an axle carriage 16, an axle assembly 18, and a pair of suspension cylinders 20.

Oil sump 12 is typically part of and located at the bottom of an internal combustion (IC) engine which defines the prime mover for the tractor 10. The IC engine is usually a diesel engine, but can be a different type of engine such as a gasoline or liquid propane (LP) engine. For most current day tractors, the cast body of the IC engine also defines part of the chassis of the tractor 10. However, it is also possible for the chassis to include separate frame members to which the engine is mounted. In the illustrated embodiment, the oil sump 12 is a casting which defines part of the chassis of the tractor 10.

The suspension arm 14 includes a number of rear pivot arms 22 which are pivotally connected to the chassis of the tractor 10. In the illustrated embodiment, the rear pivot arms 22 are pivotally connected to the oil sump 12, as shown in FIG. 2. The front end of the suspension arm 14 has a circular housing 24 which fits around the input coupler 26 of the axle assembly 18. The input coupler 26 can be coupled with the drive shaft 28 for the MFD of the axle assembly 18. As the axle assembly 18 moves up and down relative to the axle carriage 16, the circular housing 24 can also pivot a limited extent relative to the input coupler 26.

The axle carriage 16 is mounted to the front end of the oil sump 12. Like the oil sump 12 described above, the axle carriage 16 can be attached to or form part of the chassis of the tractor 10. In the illustrated embodiment, the axle carriage 16 is formed from a heavy casting which is part of the chassis of the tractor 10.

Figure 3:
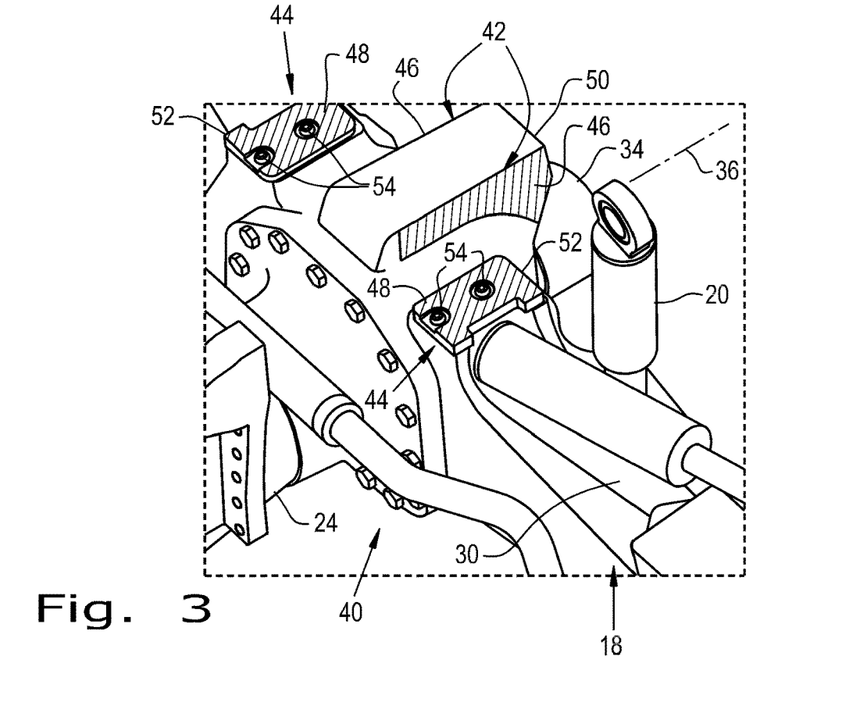
FIG. 3 is a top perspective view of the axle assembly shown in FIGS. 1 and 2.

The axle assembly 18 includes a rigid axle 30 and a pair of wheel hubs 32 mounted at each outboard end of the rigid axle 30. Wheels (not shown) are typically mounted to the hubs 32 in known manner. In the illustrated embodiment, the axle assembly 18 also includes a pivot member 34 which is located approximately midway between the wheel hubs 32 and extends in a forward direction from the front of the rigid axle 18. The pivot member 34 can be in the form of a cylindrical member, as shown, and has a longitudinal axis 36 which extends in a fore-to-aft direction of the tractor 10 through the center of the input coupler 26. The pivot member 34 is positioned and movable within a generally vertically arranged slot 38 formed in the forward end of the axle carriage 16.

The pair of suspension cylinders 20 are each connected between the axle carriage 16 and the rigid axle 30. In the illustrated embodiment, the suspension cylinders 20 are positioned on opposite lateral sides of the pivot member 34. However, the suspension cylinders 20 can be located elsewhere, such as behind the rear axle and/or under the axle carriage 20. The pair of suspension cylinders 20 are operable to move the rigid axle 30 in vertical directions relative to the axle carriage 16 using a controller (not shown).

Figure 4:
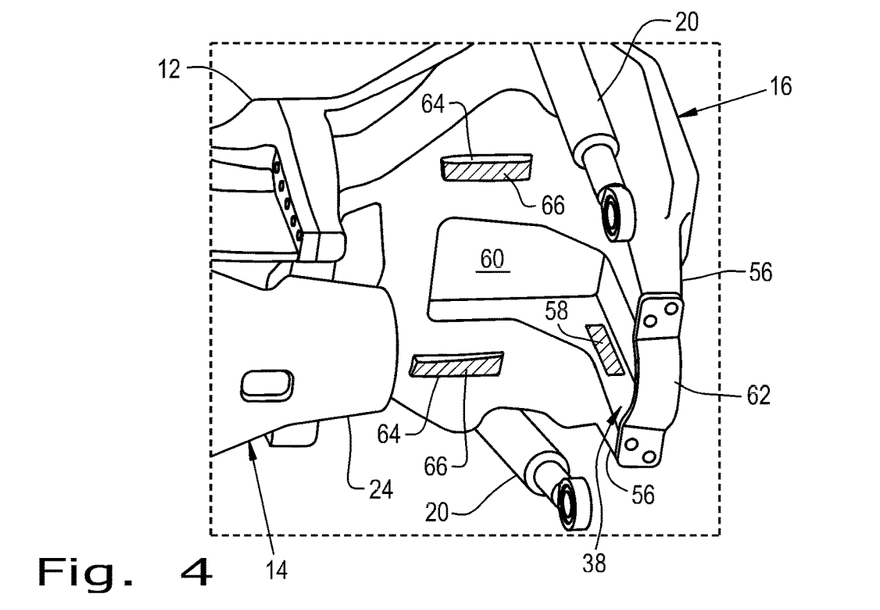
FIG. 4 is a bottom perspective view of the axle carriage shown in FIGS. 1 and 2.
Figure 5:
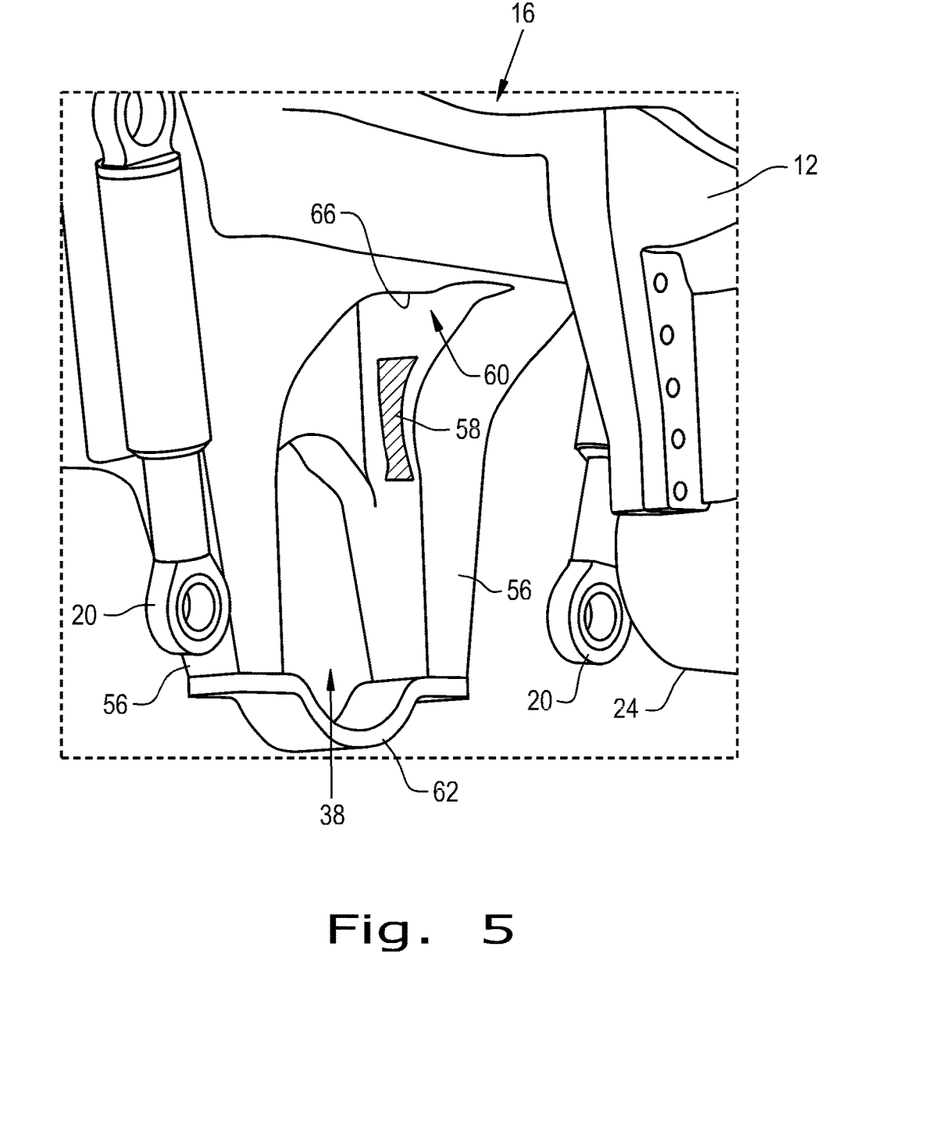
FIG. 5 is another bottom perspective view of the axle carriage shown in FIGS. 1, 2 and 4.

According to an aspect of the present invention, and referring now to FIGS. 3-5, a suspension system 40 includes the axle carriage 16, axle 30, suspension cylinders 20 and two pairs of roll angle stops 42 and 44 between the axle carriage 16 and axle 30. More particularly, the axle 30 includes a first pair of roll angle stops 42 which engage the axle carriage 16 when the axle 30 is at or near a compressed or fully lowered position relative to the axle carriage 16, and the axle 30 includes a second pair of roll angle stops 44 which engage the axle carriage 16 when the axle 30 is at or near an extended or fully raised position relative to the axle carriage 16.

The first pair of roll angle stops 42 each include a generally vertically arranged stop surface 46, and the second pair of roll angle stops 44 each include a generally horizontally arranged stop surface 48. The axle 30 includes an upwardly extending block 50 with a pair of opposed side surfaces respectively defining the generally vertically arranged stop surfaces 46. The vertically arranged stop surfaces 46 can be generally perpendicular to the longitudinal axis of the axle 30, as shown, and thus substantially vertical when the axle 30 is positioned horizontally. Alternatively, the vertically arranged stop surfaces 46 can be at some predetermined angle less than 90° relative to the longitudinal axis of the axle 30 (e.g., 80°-90°).

The second pair of roll angle stops 44 defined by the generally horizontally arranged stop surfaces 48 are positioned on each lateral side of the block 50. The second pair of roll angle stops 44 each include a plate 52 mounted to a top of the axle 30, with each plate 52 having an upper surface defining the generally horizontally arranged stop surface 48. The generally horizontally arranged stop surface 48 of each plate 52 is positioned at a predetermined angle relative to horizontal. In the illustrated embodiment, the generally horizontally arranged stop surface 48 is at a slight acute angle relative to a horizontal reference plane (e.g., 1 to 10°). In other embodiments, the generally horizontally arranged stop surface 48 can be parallel to the longitudinal axis of the axle 30 (i.e., horizontal). The plates 52 can be removably attached to the axle 30 using any suitable fastening technique, such as by using fasteners 54 which pass through holes formed in plate 52 and are threaded into the top surface of the axle 30. The use of removable plates 52 allows the use of plates with different physical geometries, depending on the application. The plates 52 can also be non-removably attached to the top of the axle 30, such as by welding the plates 52 to the axle 30.

The axle carriage 16 includes a pair of downwardly extending legs 56 at the forward end thereof which define the slot 38. Each leg 56 has a laterally inside surface defining a mating stop surface 58 which is engageable with a corresponding vertically arranged stop surface 46 on the block 50, as will be described below. The axle carriage 16 also includes an upwardly extending recess 60 between and rearward of the legs 56. The block 50 fits within the recess 60 when the axle 30 is in the fully raised position relative to the axle carriage 16. A cover plate 62 is fastened to the bottom end of the legs 56 and defines a stop limit when the axle 30 is at a fully lowered position relative to the axle carriage 16. In particular, when the pivot member 34 contacts the cover plate 62 the axle is at the fully lowered position.

The axle carriage 16 also includes a pair of bosses 64 formed at the bottom thereof which define a pair of mating stop surfaces 66 which are engageable with a corresponding horizontally arranged stop surface 48 on the axle 30, as will be described below. The thickened area of the bosses 64 helps with loading when the horizontal stop surfaces 48 contact the bottom of the axle carriage 16. However, such a thickened area or boss may not be necessary, depending on the construction of the axle carriage 16, and the horizontal stop surfaces 48 may directly contact the axle carriage 16 without such a boss or reinforced area. As another option, plates similar to the plates 52 can be attached to the bottom side of the axle carriage 16 at the places of contact with the plates 52.

The various components acting together to limit the roll angle of the axle 30 relative to the axle carriage 16 are collectively referred to as a roll angle stop arrangement of the present invention. Such components can include the first pair of roll angle stops 42, the second pair of roll angle stops 44, the mating stop surfaces 58, the pivot member 34, the vertically arranged slot 38, and the mating stop surfaces 66. These various components work together to define the roll angle stop arrangement. The exterior shape of the axle 30 and axle carriage 16 also affect the size and shape of the other components making up the roll angle stop arrangement.

Referring now to FIGS. 6-12, operation of the suspension system 40 will be described in greater detail. The first pair of roll angle stops 42 engage the axle carriage 16 when the axle 30 is within a first predetermined range of movement relative to the axle carriage 16, and the second pair of roll angle stops 44 engage the axle carriage 16 when the axle 30 is within a second predetermined range of movement relative to the axle carriage 16. The first predetermined range of movement is adjacent to the fully lowered position (i.e., in the lower region of the stroke length of the suspension cylinders 20), and the second predetermined range of movement is adjacent to the fully raised position (i.e., in the upper region of the stroke length of the suspension cylinders 20).

Figure 6:
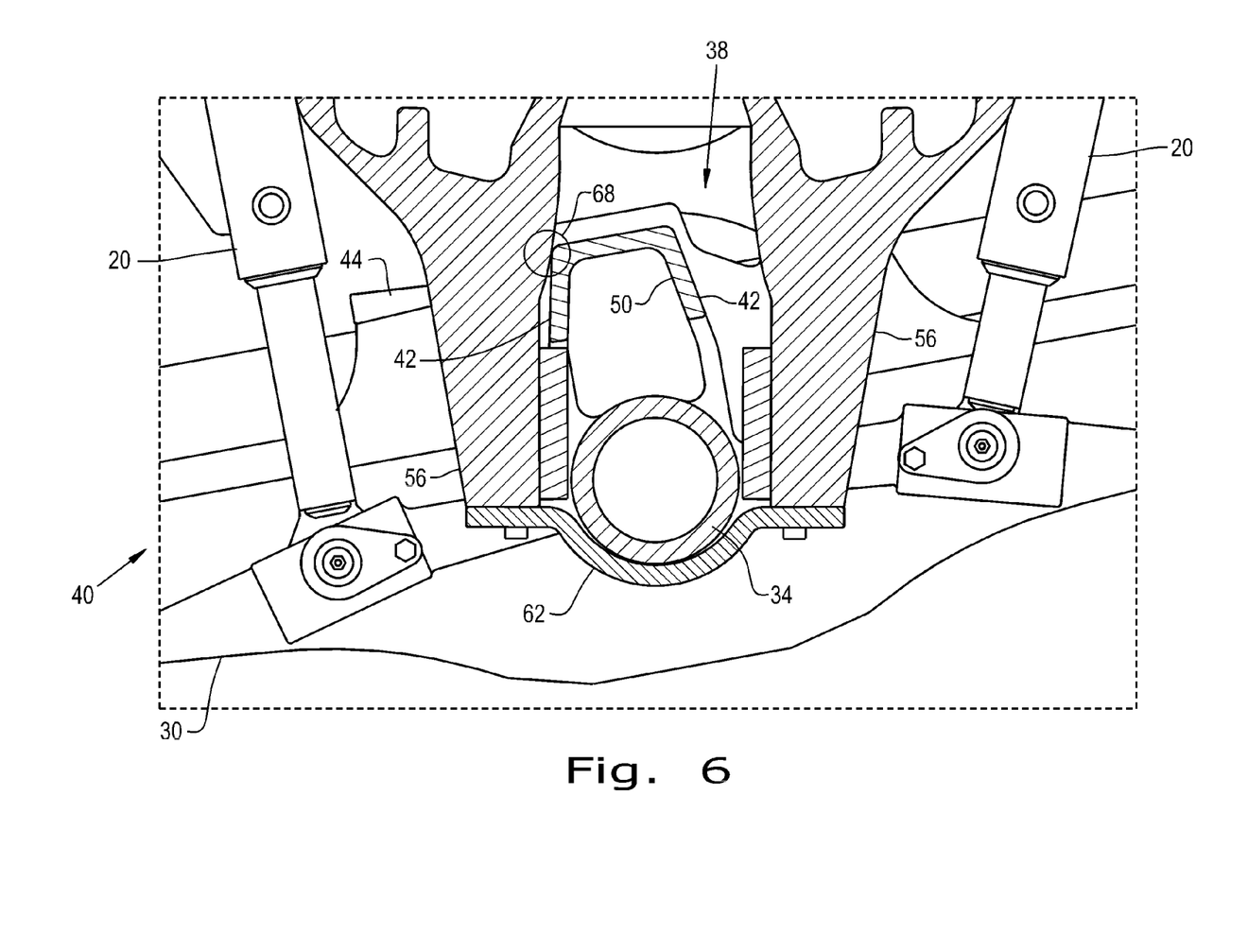
FIG. 6 is a front view of the assembled suspension system, with the axle in a fully lowered position relative to the axle carriage, showing one of the generally vertical roll angle stops contacting the axle carriage.
Figure 7:
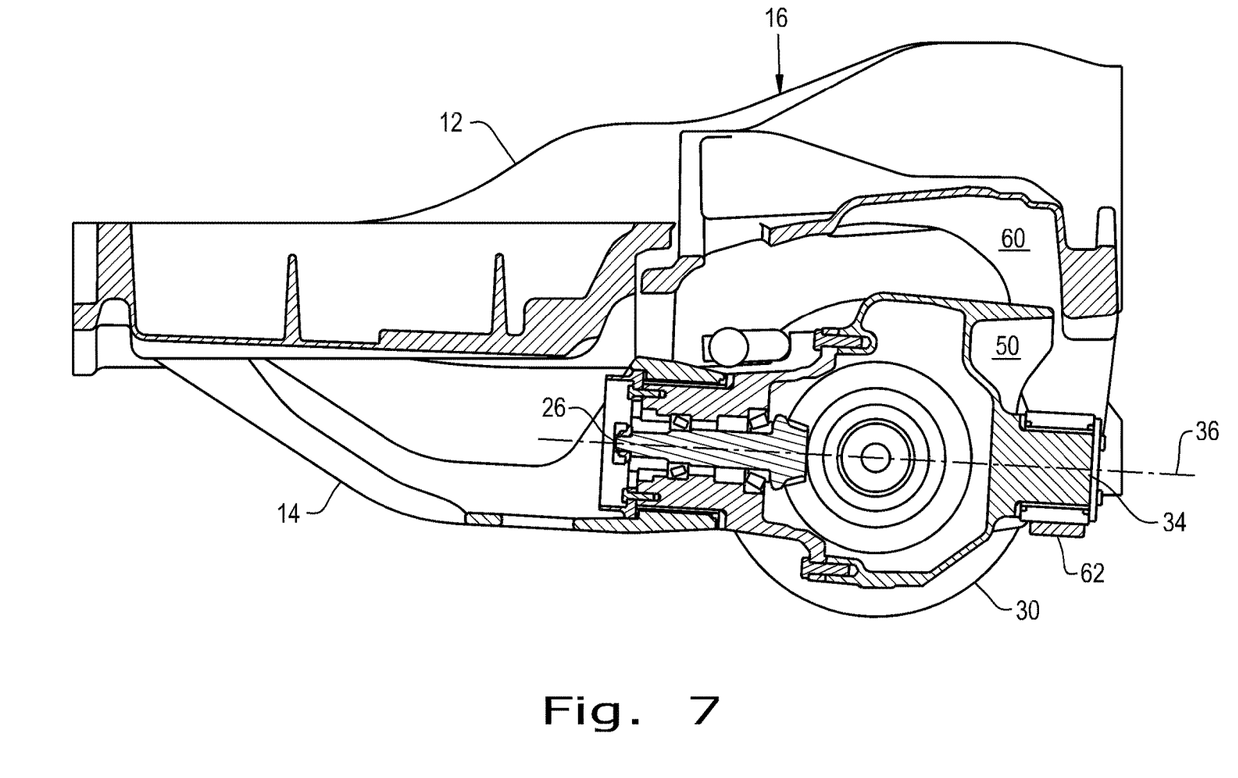
FIG. 7 is a longitudinal sectional view of the axle and axle carriage, with the axle in the fully lowered position shown in FIG. 6.

Referring to FIGS. 6 and 7, the axle 30 is shown in a fully lowered position relative to the axle carriage 16, with the pivot member 34 against the cover plate 62. In the illustrated embodiment, the pivot member 34 is movable an overall stroke length of approximately 110 mm, with a neutral position in the middle and a 55 mm stroke length above and below the neutral position. When in the fully lowered position, a vertically arranged stop surface 46 on the side of block 50 contacts a corresponding mating stop surface 58 on the side of a leg 56 when the axle 30 is at approximately an 8.3° roll angle relative to a horizontal reference. The contact area 68 between the vertically arranged stop surface 46 and the corresponding mating stop surface 58 is shown in FIG. 6.

Figure 8:
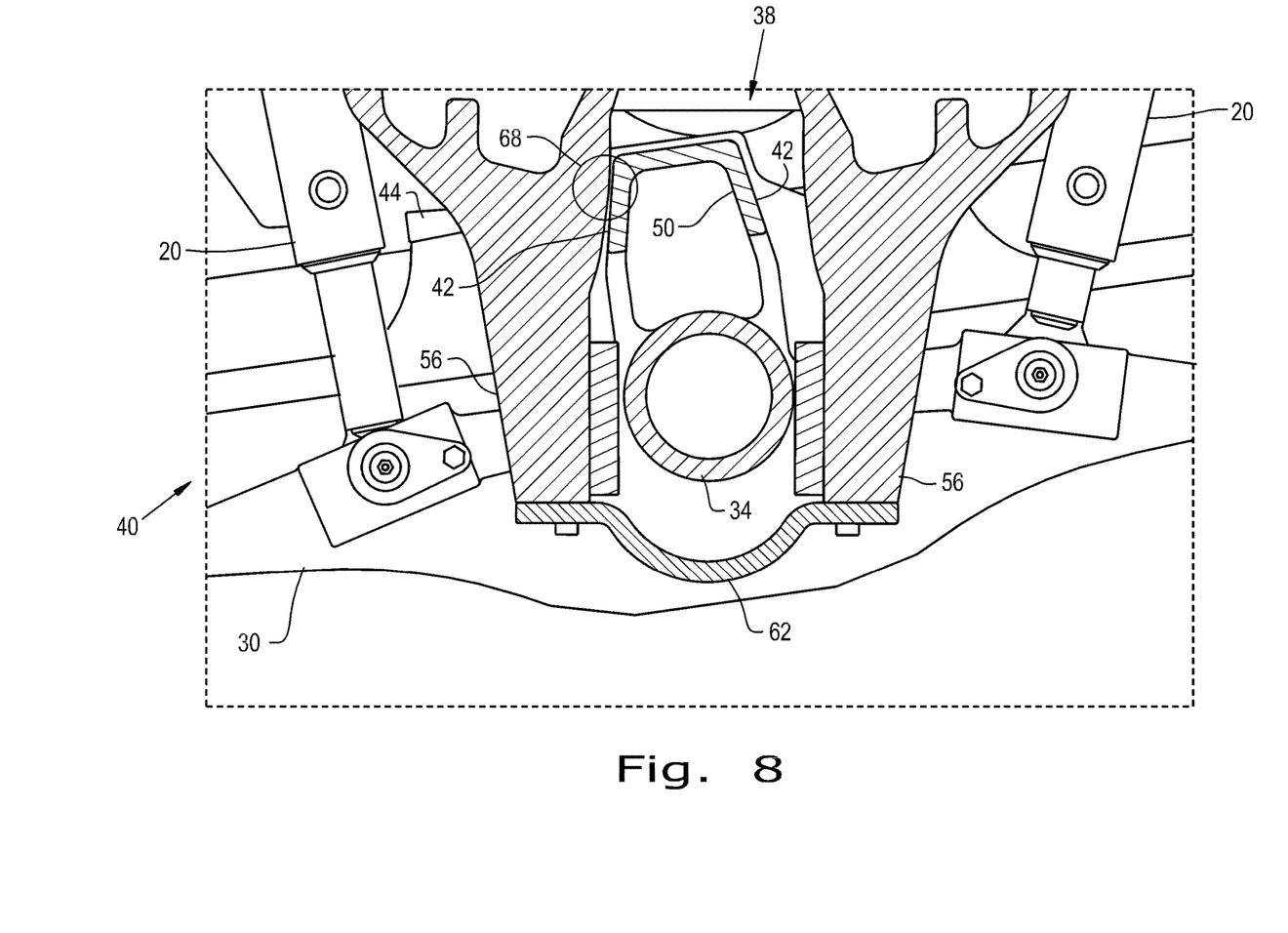
FIG. 8 is a front view of the assembled suspension system, with the axle in a neutral position approximately half way between the fully lowered position and fully raised position, showing one of the generally vertical roll angle stops contacting the axle carriage.
Figure 9:
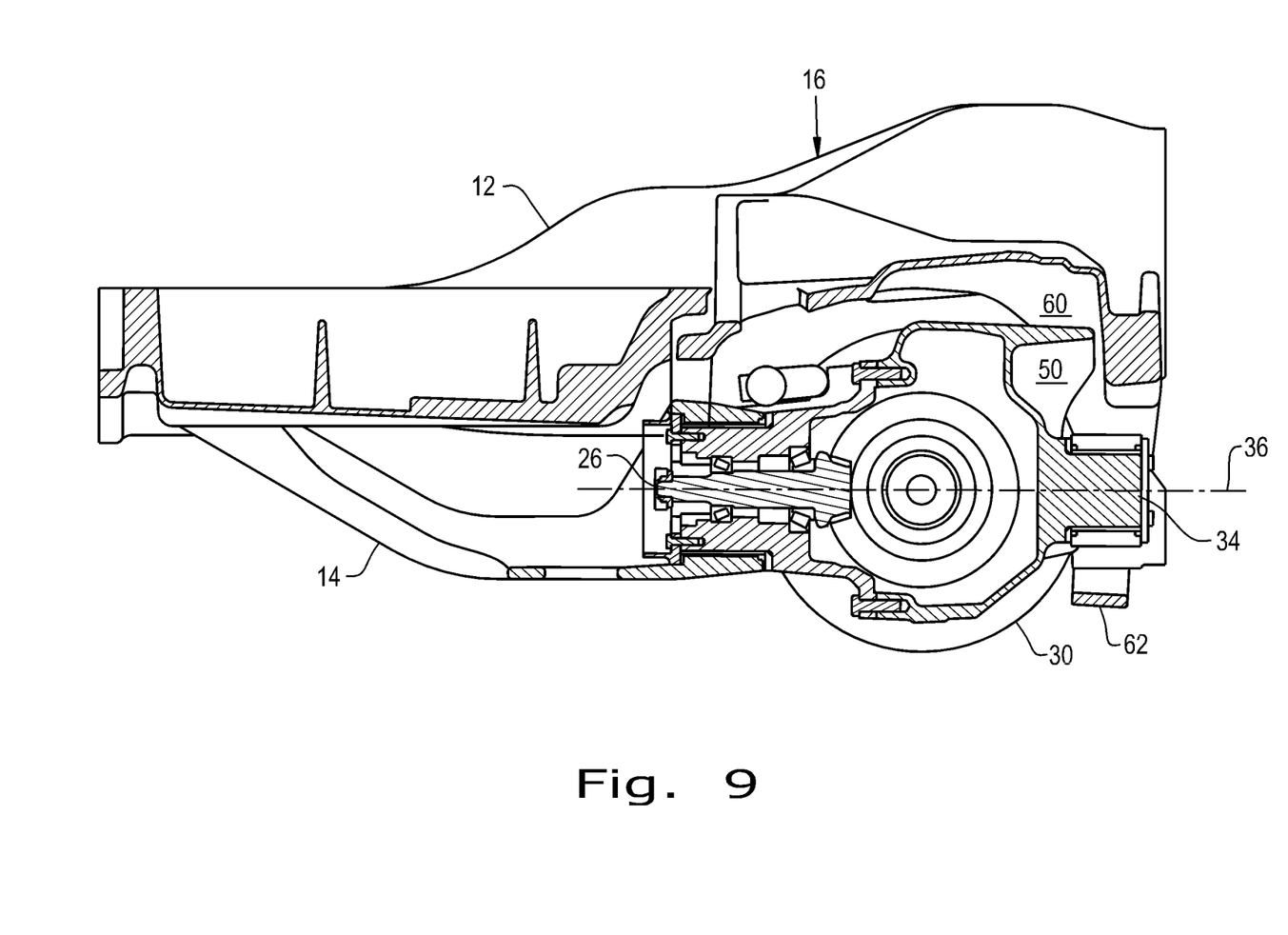
FIG. 9 is a longitudinal sectional view of the axle and axle carriage, with the axle in the neutral position shown in FIG. 8.

Referring now to FIGS. 8 and 9, the axle 30 is shown in a neutral position approximately midway between the upper and lower maximum positions. When in the neutral position, the vertically arranged stop surface 46 on the side of block 50 still contacts a corresponding mating stop surface 58 on the side of the legs 56 when the axle 30 is at approximately an 8° roll angle relative to a horizontal reference. The contact area 68 between the vertically arranged stop surface 46 and the corresponding mating stop surface 58 is shown in FIG. 8.

Figure 10:
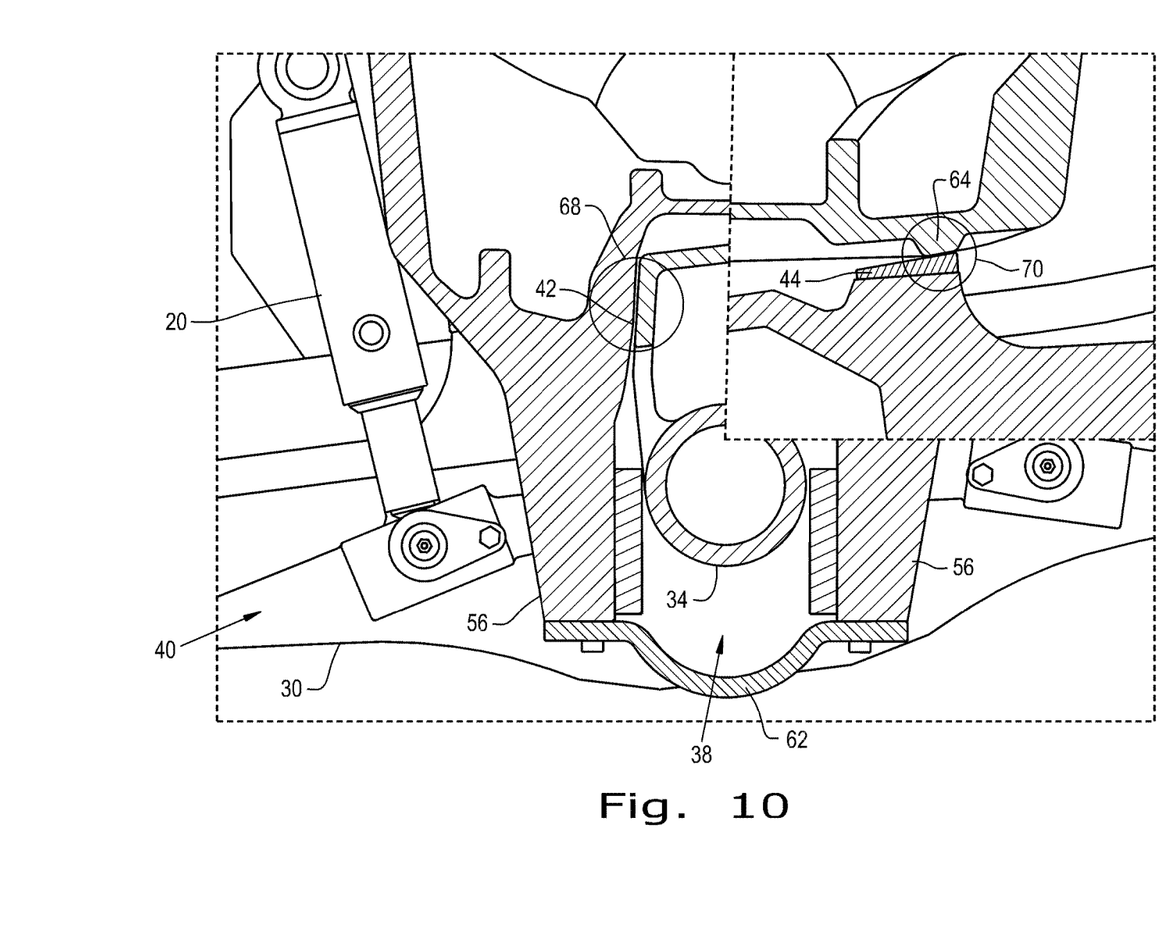
FIG. 10 is a front view of the assembled suspension system, with the axle in a transition position between the neutral and fully raised position, showing one of the generally vertical roll angle stops and one of the generally horizontal roll angle stops contacting the axle carriage.

Referring now to FIG. 10, the axle 30 is shown at the transition point where both the vertical stop surface 46 and the horizontal stop surface 48 contact the axle carriage 16 when the axle 32 reaches a maximum roll angle of approximately 7.25° relative to a horizontal reference. When the axle 30 is below this position only the vertical stop surface 46 will contact the axle carriage 16, and when the axle 30 is above this position only the horizontal stop surface 48 will contact the axle carriage 16. The contact area 68 between the vertically arranged stop surface 46 and the corresponding mating stop surface 58, and the contact area 70 between the horizontally arranged stop surface 48 and the corresponding mating stop surface 66, are each shown in FIG. 10.

In the illustration of FIG. 10, the transition point between the vertical stop surface 46 and a horizontal stop surface 48 occurs when the axle is at a stroke length of approximately 37 mm above the neutral position. The particular transition point between the vertical stop surface 46 and a horizontal stop surface 48 can vary depending on the design and configuration of the first and second pair of roll angle stops 42 and 44 and/or the corresponding mating stop surfaces 58 and 66.

Figure 11:
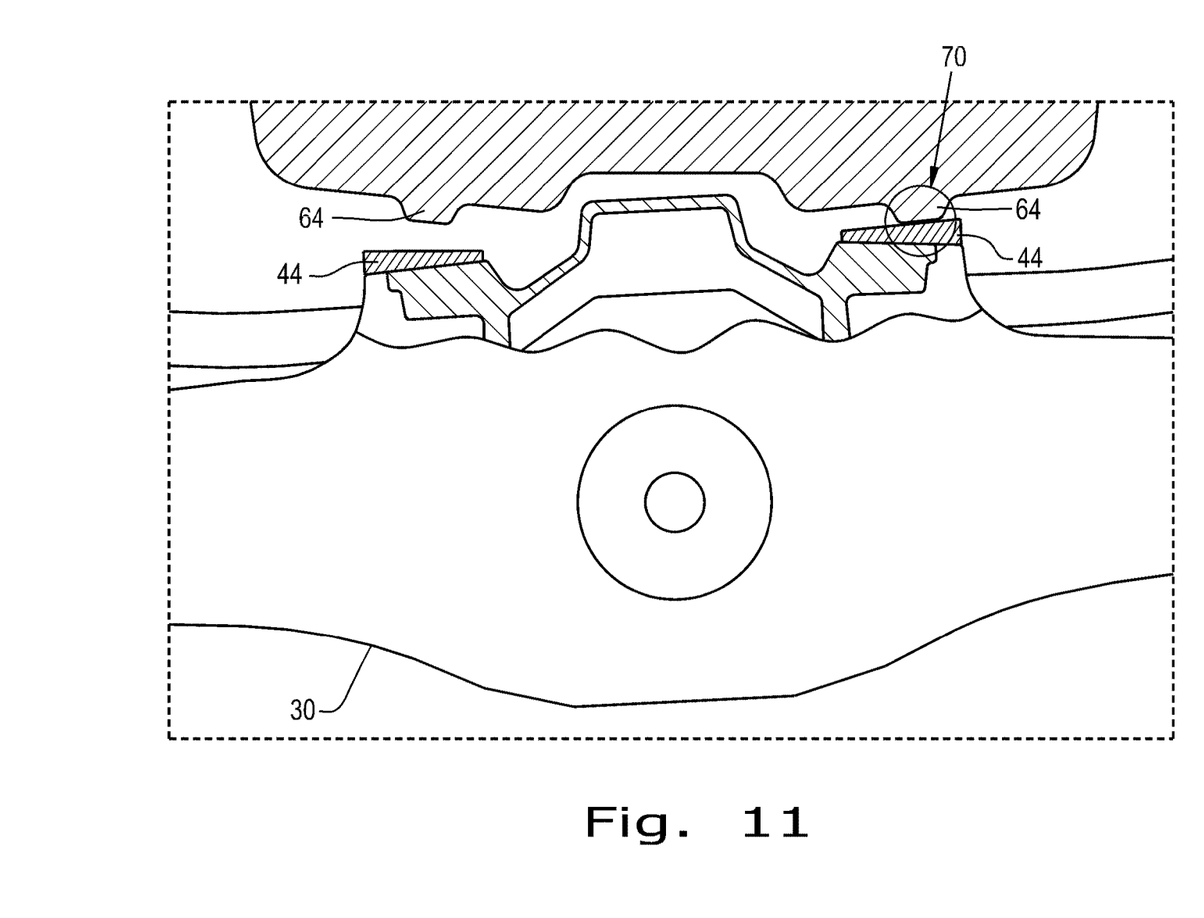
FIG. 11 is a front sectional view of the assembled suspension system, with the axle in a fully raised position relative to the axle carriage, showing one of the generally horizontal roll angle stops contacting the axle carriage.
Figure 12:
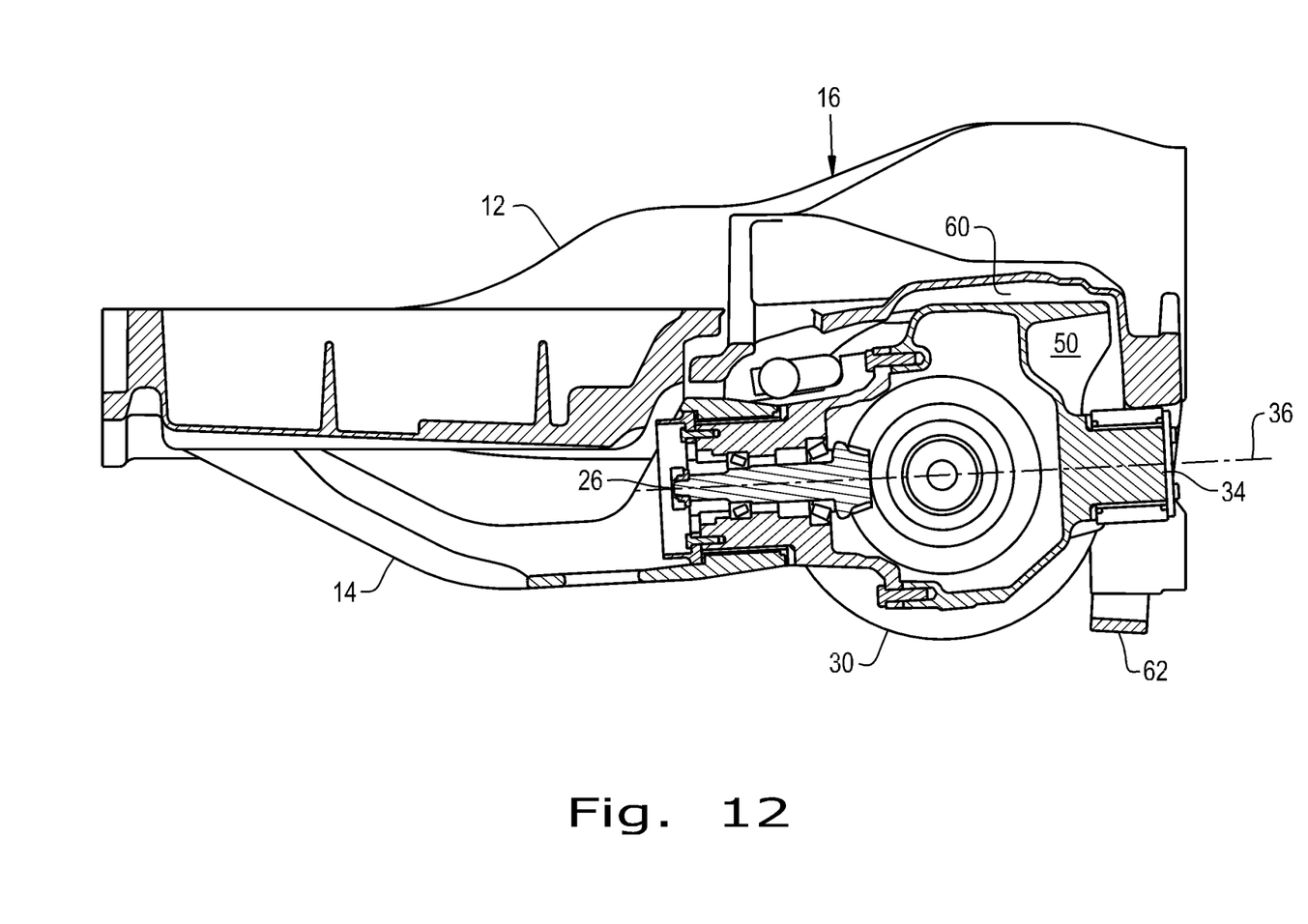
FIG. 12 is a longitudinal sectional view of the axle and axle carriage, with the axle in the fully raised position shown in FIG. 11.

Referring to FIGS. 11 and 12, the axle 30 is shown in a fully raised position relative to the axle carriage 16. When in the fully raised position, a horizontally arranged stop surface 48 on the top of the axle 30 contacts a corresponding mating stop surface 66 on the bottom of the axle carriage 16 when the axle 30 is at approximately a 3° roll angle relative to a horizontal reference. The contact area 70 between the horizontally arranged stop surface 48 and the corresponding mating stop surface 66 is shown in FIG. 11. When the axle 30 is in the fully raised position, the maximum allowed roll angle is only 3° in the illustrated embodiment to prevent the wheel assembly from contacting the chassis, sheet metal or other component of the tractor 10. The particular maximum allowed roll angle when the axle is at the fully raised position can of course vary depending on the configuration.

Figure 13:
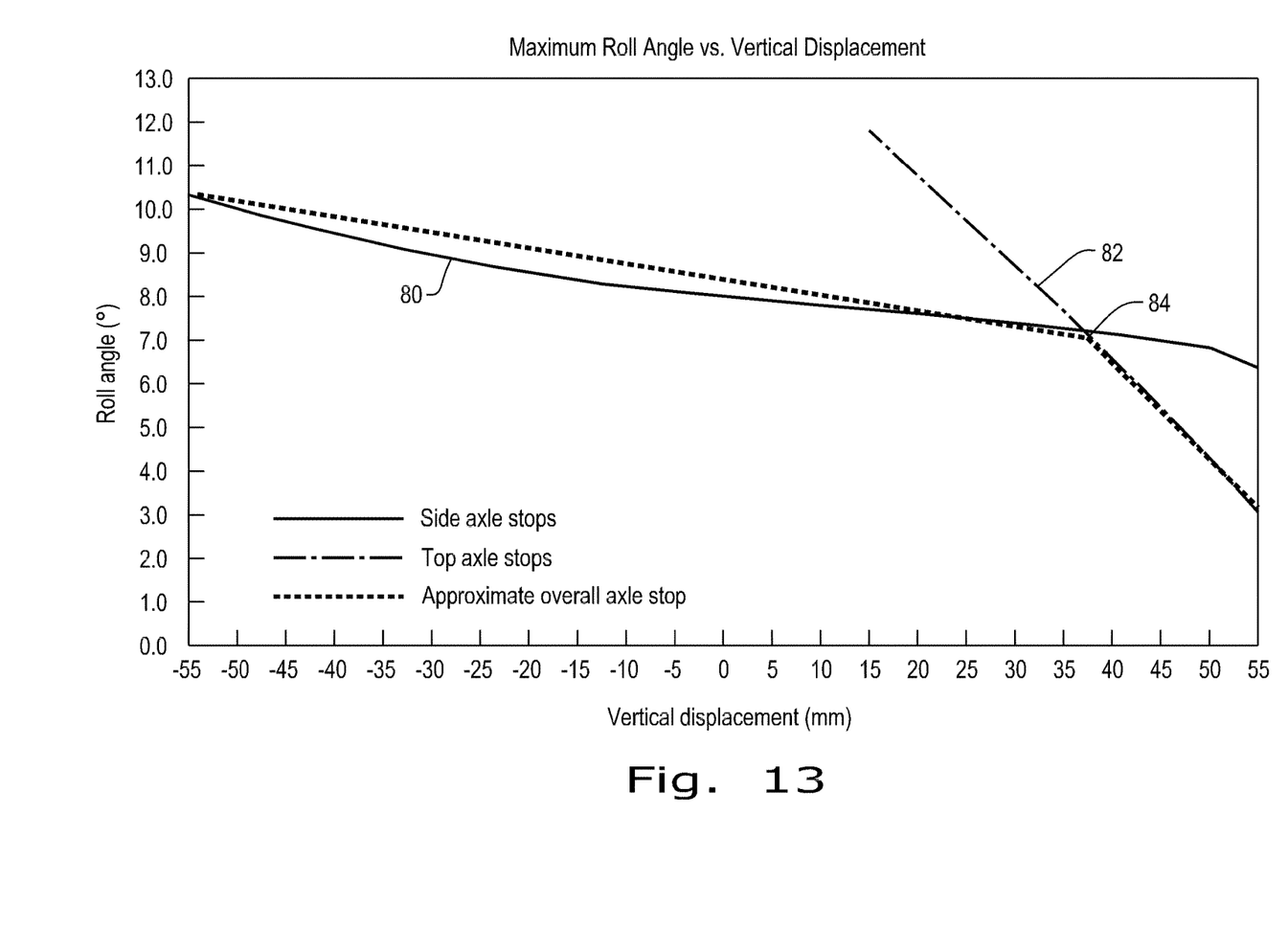
FIG. 13 is a graphical illustration of maximum roll angle versus vertical displacement using an example of the two pairs of roll angle stops of the present invention.

As the axle 30 moves up and down relative to the axle carriage 16, the axle 30 has a maximum roll angle which varies according to a first mathematical relationship when the axle 30 is at any position within the first predetermined range of movement, and the axle has a roll angle which varies according to a second mathematical relationship when the axle 30 is at any position within the second predetermined range of movement. The physical geometry of the first pair of roll angle stops 42 establishes the first mathematical relationship, and the physical geometry of the second pair of roll angle stops 44 and/or plates 52 establish the second mathematical relationship. The maximum roll angle is defined as the point at which one of the vertically arranged stop surfaces 46 and/or horizontally arranged stop surfaces 48 contacts the axle carriage 16, thereby stopping further pivoting movement of the axle 30 relative to the axle carriage 16. Referring now to FIG. 13, the first predetermined range of movement corresponds to the range of movement when the first pair of roll angle stops 42 establish the maximum allowed roll angle, and the second predetermined range of movement corresponds to a range of movement when the second pair of roll angle stops 44 establish the maximum allowed roll angle. It can be seen that the line 80 representing the first mathematical relationship during the first predetermined range of movement has a very slight curve, but can be thought of as being a generally linear relationship. Further, the line 82 representing the second mathematical relationship during the second predetermined range of movement also has a very slight curve, but can likewise be thought of as being a generally linear relationship. At the intersection point 84 between the first line 80 and the second line 82, contact between the axle 30 and axle carriage 16 transitions from the first pair of roll angle stops 42 to the second pair of roll angle stops 44, or vice versa. The line representing the second mathematical relationship to the right of the intersection point 84 has a steeper slope than the line representing the first mathematical relationship to the left of the intersection point 84. The axle 30 has a smallest maximum roll angle when the axle 30 is at the fully raised position (to the right of the graph), and the axle 30 has a greatest maximum roll angle when the axle is at the fully lowered position (to the left of the graph). The dashed line represents the linear approximate overall axle stop using each of the first and second pair of roll angle stops 42 and 44.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An off-road vehicle, comprising:
a chassis;
an axle carriage attached to or forming a part of the chassis;
a pair of suspension cylinders, each said suspension cylinder being connected to said axle carriage;
a rigid axle mounted to the axle carriage and movable in vertical directions relative to the axle carriage using the pair of suspension cylinders, the axle including a first pair of roll angle stops which engage the axle carriage when the axle is at or near a fully lowered position relative to the axle carriage, and a second pair of roll angle stops which engage the axle carriage when the axle is at or near a fully raised position relative to the axle carriage.

2. The off-road vehicle of claim 1, wherein the first pair of roll angle stops each include a generally vertically arranged stop surface, and the second pair of roll angle stops each include a generally horizontally arranged stop surface.

3. The off-road vehicle of claim 2, wherein the axle carriage includes a generally vertically arranged slot, and the axle includes a generally cylindrical pivot member located approximately midway between the ends of the axle and having a longitudinal axis extending generally in a fore-aft direction of the off-road vehicle, the pivot member being positioned and vertically movable within the slot of the axle carriage.

4. The off-road vehicle of claim 3, wherein the axle carriage includes a pair of downwardly extending legs defining said slot, and the axle includes an upwardly extending block with a pair of opposed side surfaces respectively defining said generally vertically arranged stop surfaces, each said generally vertically arranged stop surface being engagable with a corresponding said leg.

5. The off-road vehicle of claim 4, wherein said axle carriage includes an upwardly extending recess between said legs and said block fits within said recess when the axle is in the fully raised position.

6. The off-road vehicle of claim 4, wherein said pair of generally horizontally arranged stop surfaces are positioned on each lateral side of the block.

7. The off-road vehicle of claim 6, wherein said second pair of roll angle stops each include a plate mounted to a top of the axle, each said plate having an upper surface defining the generally horizontally arranged stop surface.

8. The off-road vehicle of claim 7, wherein the upper surface of each said plate is positioned at a predetermined angle relative to horizontal.

9. The off-road vehicle of claim 1, wherein the first pair of roll angle stops engage the axle carriage when the axle is within a first predetermined range of movement relative to the axle carriage, and the second pair of roll angle stops engage the axle carriage when the axle is within a second predetermined range of movement relative to the axle carriage.

10. The off-road vehicle of claim 9, wherein the first predetermined range of movement is adjacent to the fully lowered position, and the second predetermined range of movement is adjacent to the fully raised position.

11. The off-road vehicle of claim 9, wherein the axle has a maximum roll angle which varies according to a first mathematical relationship when the axle is at any position within the first predetermined range of movement, and wherein the axle has a maximum roll angle which varies according to a second mathematical relationship when the axle is at any position within the second predetermined range of movement.

12. The off-road vehicle of claim 11, wherein the first mathematical relationship and the second mathematical relationship are each generally linear relationships, with the second mathematical relationship having a steeper slope than the first mathematical relationship.

13. The off-road vehicle of claim 12, wherein a distinct crossover point exists between the first mathematical relationship and the second mathematical relationship.

14. The off-road vehicle of claim 11, wherein the axle has a smallest roll angle when the axle is at the fully raised position, and the axle has a greatest roll angle when the axle is at the fully lowered position.

15. The off-road vehicle of claim 1, wherein the axle is at the fully lowered position when the pivot member is seated against a bottom of the slot.

16. An off-road vehicle, comprising:
a chassis;
an axle carriage attached to or forming a part of the chassis;
a pair of suspension cylinders, each said suspension cylinder being connected to said axle carriage;
a rigid axle mounted to the axle carriage and movable in vertical directions relative to the axle carriage using the pair of suspension cylinders, the axle including a first pair of roll angle stops which engage the axle carriage when the axle is within a first predetermined range of movement relative to the axle carriage, and a second pair of roll angle stops which engage the axle carriage when the axle is within a second predetermined range of movement relative to the axle carriage.

17. The off-road vehicle of claim 16, wherein the first predetermined range of movement is adjacent to a fully lowered position, and the second predetermined range of movement is adjacent to a fully raised position.

18. The off-road vehicle of claim 16, wherein the axle has a maximum roll angle which varies according to a first mathematical relationship when the axle is at any position within the first predetermined range of movement, and wherein the axle has a maximum roll angle which varies according to a second mathematical relationship when the axle is at any position within the second predetermined range of movement.

19. The off-road vehicle of claim 18, wherein the first mathematical relationship and the second mathematical relationship are each generally linear relationships, with the second mathematical relationship having a steeper slope than the first mathematical relationship.

20. The off-road vehicle of claim 19, wherein a distinct crossover point exists between the first mathematical relationship and the second mathematical relationship.

* * * * *